US012075777B2

(12) United States Patent
Pimentel

(10) Patent No.: US 12,075,777 B2
(45) Date of Patent: *Sep. 3, 2024

(54) ANTIMICROBIAL FORMULATION

(75) Inventor: Julio Pimentel, Buford, GA (US)

(73) Assignee: Anitox Corporation, Lawrenceville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/392,518

(22) PCT Filed: Aug. 13, 2011

(86) PCT No.: PCT/US2011/047693
§ 371 (c)(1),
(2), (4) Date: May 26, 2012

(87) PCT Pub. No.: WO2012/027140
PCT Pub. Date: Mar. 1, 2012

(65) Prior Publication Data
US 2012/0252893 A1 Oct. 4, 2012

(51) Int. Cl.
A01N 37/02 (2006.01)
A01N 31/16 (2006.01)
A01N 35/02 (2006.01)
A23K 20/10 (2016.01)
A23K 20/111 (2016.01)
A23K 50/75 (2016.01)

(52) U.S. Cl.
CPC ............. *A01N 37/02* (2013.01); *A01N 31/16* (2013.01); *A01N 35/02* (2013.01); *A23K 20/10* (2016.05); *A23K 20/111* (2016.05); *A23K 50/75* (2016.05)

(58) Field of Classification Search
CPC ........ A01N 37/02; A01N 31/16; A01N 35/02; A23K 50/75; A23K 20/10; A23K 20/111
See application file for complete search history.

(56) References Cited

U.S. PATENT DOCUMENTS

| 5,093,124 | A | | 3/1992 | Kulenkampff |
| 5,342,630 | A | | 8/1994 | Jones |
| 5,366,995 | A | | 11/1994 | Savage et al. |
| 5,547,987 | A | | 8/1996 | Bland et al. |
| 5,587,358 | A | | 12/1996 | Sukigara et al. |
| 5,591,467 | A | | 1/1997 | Bland et al. |
| 5,663,152 | A | | 9/1997 | Hayano et al. |
| 5,673,468 | A | | 10/1997 | Pumpe |
| 5,698,599 | A | * | 12/1997 | Subbiah ................ A01N 35/02 514/703 |
| 5,776,919 | A | | 7/1998 | Sukigara et al. |
| 5,849,956 | A | | 12/1998 | Koga et al. |
| 5,911,915 | A | | 6/1999 | Fonsny et al. |
| 5,939,050 | A | | 8/1999 | Iyer et al. |
| 6,103,768 | A | | 8/2000 | Savage et al. |
| 6,121,224 | A | | 9/2000 | Fonsny et al. |
| 6,136,856 | A | | 10/2000 | Savage et al. |
| 6,201,026 | B1 | | 3/2001 | Hammond et al. |
| 6,323,171 | B1 | | 11/2001 | Fonsny et al. |
| 6,387,866 | B1 | | 5/2002 | Mondin et al. |
| 6,468,953 | B1 | * | 10/2002 | Hitchens et al. ............ 510/218 |
| 6,475,976 | B1 | | 11/2002 | Mahieu et al. |
| 6,479,044 | B1 | | 11/2002 | Mahieu et al. |
| 6,479,454 | B1 | * | 11/2002 | Smith et al. .................. 510/503 |
| 6,566,312 | B2 | | 5/2003 | Bettiol et al. |
| 6,569,261 | B1 | * | 5/2003 | Aubay et al. .................... 134/39 |
| 6,596,681 | B1 | | 7/2003 | Mahieu et al. |
| 6,596,763 | B1 | | 7/2003 | Thormar et al. |
| 6,638,978 | B1 | | 10/2003 | Kabara |
| 6,750,256 | B1 | | 6/2004 | Crandall, Jr. et al. |
| 6,852,340 | B1 | * | 2/2005 | Gaumer ................. A01N 59/12 424/667 |
| 6,855,669 | B2 | * | 2/2005 | Knowles et al. ............ 504/348 |
| 6,960,350 | B2 | * | 11/2005 | Hanada et al. ............... 424/404 |
| RE39,543 | E | | 4/2007 | Emerson et al. |
| 7,638,114 | B1 | * | 12/2009 | Schur ..................... A01N 25/18 422/28 |
| 9,290,448 | B2 | * | 3/2016 | Li .......................... A01N 41/04 |
| 10,736,343 | B2 | * | 8/2020 | Pimentel ............. A23K 20/105 |
| 2002/0009527 | A1 | | 1/2002 | Bland et al. |
| 2003/0228402 | A1 | * | 12/2003 | Franklin et al. .............. 426/541 |
| 2004/0026685 | A1 | | 2/2004 | Ito et al. |
| 2004/0234662 | A1 | * | 11/2004 | Ben-Yehoshua .............. 426/532 |

(Continued)

FOREIGN PATENT DOCUMENTS

CN 1268874 A 4/2000
DE 161131 2/1985

(Continued)

OTHER PUBLICATIONS

Lanciotti, "Application of Hexanal, (E)-2-Hexenal, and Hexyl Acetate To Improve the Safety of Fresh-Sliced Apples", J. Agric. Food Chem. 2003, 51, 10, pp. 2958-2963 (Year: 2003).*
Andersen et al., "Structure—Antifungal Activity Relationships Among Volatile C6 and C9 Aliphatic Aldehydes, Ketones, and Alcohols", Journal of Agricultural and Food Chemistry, 1994, pp. 1563-1568, vol. 42.
Ceylan et al., "Antimicrobial Activity of Spices", Rapid Methods in Microbiology, 2004, pp. 1-55, vol. 12.
Chadeganipour et al., "Antifungal Activities of Pelargonic and Capric Acid on Microsporum Gypseum", Mycoses, 2001, pp. 109-112, vol. 44 No. 3-4.
Deng et al., "Effects of Six-Carbon Aldehydes and Alcohols on Bacterial Proliferation", Journal of Agricultural and Food Chemistry, 1993, pp. 506-510, vol. 41.

(Continued)

*Primary Examiner* — Changqing Li
(74) *Attorney, Agent, or Firm* — Thompson Coburn LLP; Steven M. Ritchey

(57) ABSTRACT

An anti-microbial composition for treating animal feed, comprising:
1 to 90 wt. %, based on the total weight, of a $C_1$ to $C_{24}$ organic acid,
1 to 90 wt. %, based on the total weight, of trans-2-hexenal provided it constitutes at least 5 wt. % of the organic acid and aldehyde mixture,
0 to 50 wt. % based on the total weight of terpenes,
0 to 20 wt. % based on the total weight of a surfactant, and water.

3 Claims, No Drawings

(56) References Cited

U.S. PATENT DOCUMENTS

| | | |
|---|---|---|
| 2004/0266852 A1 | 12/2004 | Coleman |
| 2005/0031744 A1 | 2/2005 | Paliyath et al. |
| 2005/0118211 A1* | 6/2005 | Nakamura ............... A61K 8/06 424/401 |
| 2005/0170052 A1 | 8/2005 | Pimentel |
| 2005/0214291 A1* | 9/2005 | Lee et al. .................... 424/144.1 |
| 2006/0034880 A1* | 2/2006 | Christmas et al. ........... 424/405 |
| 2006/0159727 A1* | 7/2006 | Pimentel ............... A23L 3/3463 424/442 |
| 2007/0048344 A1 | 3/2007 | Yahiaoui et al. |
| 2007/0048345 A1* | 3/2007 | Huang ................... A01N 31/02 424/405 |
| 2007/0087094 A1* | 4/2007 | Schuer ................. A23L 3/3463 426/335 |
| 2007/0248668 A1* | 10/2007 | Michaelis .............. A61K 45/06 424/464 |
| 2009/0249557 A1 | 10/2009 | Maki et al. |
| 2009/0263549 A1 | 10/2009 | Kleve et al. |
| 2010/0021557 A1* | 1/2010 | Li ........................... A01N 41/08 424/616 |
| 2011/0150817 A1* | 6/2011 | Woo .......................... A61L 9/01 424/76.21 |
| 2012/0058075 A1* | 3/2012 | Petrucci et al. ............. 424/76.8 |
| 2012/0128843 A1 | 5/2012 | Richardson et al. |
| 2012/0148718 A1 | 6/2012 | Wilson et al. |
| 2012/0164081 A1* | 6/2012 | de Lame et al. ............... 424/45 |
| 2012/0202867 A1* | 8/2012 | Walter et al. ................ 514/406 |
| 2014/0323572 A1 | 10/2014 | Pimentel et al. |
| 2015/0031762 A1 | 1/2015 | Pimentel et al. |
| 2015/0208697 A1 | 7/2015 | Richardson et al. |

FOREIGN PATENT DOCUMENTS

| | | |
|---|---|---|
| EP | 0266199 | 5/1988 |
| EP | 0991327 A1 | 4/2000 |
| EP | 1214879 | 6/2002 |
| EP | 1214879 A2 | 6/2002 |
| EP | 0991327 | 12/2004 |
| ES | 2234127 | 6/1998 |
| ES | 2247701 | 3/2006 |
| JP | 2000-325037 A | 11/2000 |
| JP | 2000325037 | 11/2000 |
| JP | 2002-511083 | 4/2002 |
| JP | 2004-513153 | 4/2004 |
| RU | 2332361 C1 | 8/2008 |
| WO | WO 95/28091 | 10/1995 |
| WO | WO 96/11585 | 4/1996 |
| WO | WO 97/28896 | 8/1997 |
| WO | 99/00026 A1 | 1/1999 |
| WO | WO 99/00025 | 1/1999 |
| WO | WO 99/60865 | 12/1999 |
| WO | 01/32020 A2 | 5/2001 |
| WO | WO 01/32020 | 5/2001 |
| WO | 01/97799 A1 | 12/2001 |
| WO | 2002080668 A2 | 10/2002 |
| WO | 03070181 A2 | 8/2003 |
| WO | WO 03/070181 | 8/2003 |
| WO | 2008/031087 A1 | 3/2008 |
| WO | WO 11/025496 | 3/2011 |

OTHER PUBLICATIONS

Dilantha et al., "Identification and Use of Potential Organic Antifungal Volatiles in Biocontrol", Biology and Biochemistry, 2005, pp. 955-964, vol. 37.
English Translation of JP Publication 2000-325037 dated Nov. 28, 2000.
Extended European Search Report for EP 11820383.5 dated Mar. 19, 2014.
Fallik et al., "Trans-2-Hexenal Can Stimulate Botrytis Cinerea Growth in Vitro and on Strawberries in Vivo During Storage", American Society for Horticulture Science, 1998, pp. 875-881, vol. 123 No. 5.
Higgins et al., "Efficacy of Several Organic Acids Against Mold", Journal of Applied Poultry Research, 1999, pp. 480-487, vol. 8.
Humphrey et al., "The Vertical Transmission of Salmonellas and Formic Acid Treatment of Chicken Feed: A Possible Strategy for Control", Epidemiology and Infection, 1988, pp. 43-49, vol. 100.
International Search Report and Written Opinion for PCT/US2011/047693 dated Mar. 21, 2012.
Khan et al., "Antagonistic Effect of Fatty Acids Against Salmonella in Meat and Bone Meal", Applied Microbiology, Mar. 1969, pp. 402-404, vol. 17 No. 3.
Kim et al., "Volatile Constituents from the Leaves of Callicarpa Japonica Thunb. and their Antibacterial Activities", Journal of Agricultural and Food Chemistry, 2004, pp. 781-787, vol. 52.
Kubo et al., "Naturally Occurring Anti-Salmonella Agents", Journal of Agricultural and Food Chemistry, 2001, pp. 5750-5754, vol. 49.
Paster, "A Commercial Study of the Efficiency of Propionic Acid and Calcium Propionate as Fungistats in Poultry Feed", Poultry Science, 1979, pp. 572-576, vol. 58.
Power, "Aldehydes as Biocides", Progress in Medicinal Chemistry, 1997, vol. 34, edited by G.P. Ellis and D.K. Luscombe, Elsevier Science BV.
Rahnema et al., "Preservation and Use of Chemically Treated High-Moisture Corn by Weanling Pigs", Journal of Production and Agriculture, 1992, pp. 458-461, vol. 5 No. 4.
Van Immerseel et al., "The Use of Organic Acids to Combat Salmonella in Poultry: a Mechanistic Explanation of the Efficacy", Avian Pathology, 2006, pp. 182-188, vol. 35 No. 3.
English Translation of DD Publication 161131 dated Jun. 23, 1981.
International Search Report and Written Opinion for PCT/US2012/059169 dated Jan. 24, 2013.
Swedish Government—SOU1997:132, Antimicrobial Feed Additives, Chapters 1-4, pp. 1-140.
Brenes et al., "Essential Oils in Poultry Nutrition: Main Effects and Modes of Action", Animal Feed Science and Technology, 2010, pp. 1-14, vol. 158.
Cave, "Effect of Dietary Short- and Medium-Chain Fatty Acids on Feed Intake by Chicks", Poultry Science, 1982, pp. 1147-1153, vol. 61.
Wales et al., "Chemical Treatment of Animal Feed and Water for the Control of *Salmonella*", Foodborne Pathogens and Disease, 2010, pp. 3-15, vol. 7, No. 1.
Mar. 23, 2012, International Search Report and Written Opinion for PCT/US2011/047693.
European Search Report Application No. 11820383.5.
Nov. 28, 2000, English Abstract for 2000325037.
2004, Akbari, M.R., H. Kermanshani and G.A. Kalidari, 2004, "Effect of acetic acid administration in drinking water on performance growth characteristics and ileal microflora of broiler chickens," J. Sci. & Technol. Agric. & Natur. Resour. 3): 148.
1994, Andersen, R. A.; Hamilton-Kemp, T.; Hilderbrand, D. F.; McCraken Jr., C. T.; Collins, R. W.; Fleming, P. D. Structure—Antifungal Activity Relationships among Volatile C6 and C9 Aliphatic Aldehydes, Ketones, and Alcohols. J. Agric. Food Chem. 1994, v. 42, 1563-1568.
2005, Aneja, M., Gianfagna, T. J., and Hebbar, K. P. 2005. "Trichoderma harzianumproduces nonanoic acid, an inhibitor of spore germination andmycelial growth of two cacao pathogens". Physiol. Mol. Plant Pathol. 67, 304-307.
1999, Archbold, D.; Hamilton-Kemp, T.; Clements, A.; Collins, R. "Fumigating 'Crimson Seedless' Table Grapes 4 with (E)-2-Hexenal Reduces Mold during Long-term Postharvest Storage." HortScience. 1999, v. 34, No. 4, 705-707.
1988, Bard, M., M. R. Albert, N. Gupta, C. J. Guuynn and W. Stillwell, 1988, Geraniol Interferes with Membrane Functions in Strains of Candida and *Saccharomyces*, Lipids v. 23, No. 6, 534-538.
2007, Belletti, N.; Kamdem, S.; Patrignani, F.; Lanciotti, R.; Covelli, A.; Gardini, F. "Antimicrobial Activity of Aroma Compounds against Saccharomyces cerevisiae and Improvement of Microbiological Stability of Soft Drinks as Assessed by Logistic Regression." AEM. 2007, v. 73, No. 17, 5580-5586.
Bisignano, G.; Lagana, M. G.; Trombetta, D.; Arena, S.; Nostro, A.; Uccella, N.; Mazzanti, G.; Saija, A. "In vitro antibacterial activity

(56) References Cited

OTHER PUBLICATIONS of some aliphatic aldehydes from Olea europaea L." FEMS Microbiology Letters. 2001, v. 198, 9-13.
2001, Chadeganipour and Haims, 2001 "Antifungal activities of pelargonic and capric acid on Microsporum gypseum" Mycoses v. 44, No. 3-4, 109-112.
1992, Chaumont J. P. and D. Leger, 1992, "Campaign Against Allergic Moulds in Dwellings, Inhibitor Properties of Essential Oil Geranium "Bourbon," Citronellol, Geraniol and Citral," Ann. Pharm. Fr v. 50, No. 3, 156-166.
1993. Deng, W.; Hamilton-Kemp, T.; Nielsen, M.; Anderson, R.; Collins, G.; Hilderbrand, D. "Effects of Six-Carbon Aldehydes and Alcohols on Bacterial Proliferation." J. Agric. Food Chem. 1993, v. 41, 506-510.
1984, Elegbede, J. A., C. E. Elson, A. Qureshi, M. A. Tanner and M. N. Gould, 1984, "Inhibition of DMBA-Induced Mammary Cancer by Monoterpene D-limonene," Carcinogensis v.5, No. 5, 661-664.
1986, Elgebede, J. A., C. E. Elson, A. Qureshi, M. A. Tanner and M. N. Gould, 1986, "Regression of Rat Primary Mammary Tumors Following Dietary D-limonene," J. Nat'l Cancer Institute v.76, No. 2, 323-325.
1994, Elson C. E. and S. G. Yu, 1994, "The Chemoprevention of Cancer by Mevalonate-Derived Constituents of Fruits and Vegetables," J. Nutr. v.124, 607-614.
2005, Fruijtier-Polloth , Claudia, 2005, "Safety assessment on polyethylene glycols (PEGs) and their derivatives as used in cosmetic products" Toxicology, v. 214, 1-38.
2001, Gardini, F.; Lanciotti, R.; Guerzoni, M.E. "Effect of trans-2-hexenal on the growth of Aspergillus flavus in relation to its concentration, temperature and water activity." Letters in App. Microbiology 2001, v. 33, 50-55.
1990, Gardner, H. W.; Dornbos Jr., D. L.; Desjardins, A. E. Hexenal, trans-2-Hexenal, and trans-2-Nonenal Inhibit Soybean, Glycine max, Seed Germination. J. Agric. Food Chem. 1990, v. 38, 1316-1320.
1971, Gaunt, I. F.; Colley, J. "Acute and Short-term Toxicity Studies on trans-2-Hexenal." Fd Cosmet. Toxicol. 1971,v. 9, 775-786.
1991, Hamilton-Kemp, et. al, ( J. Agric. Food Chem. 1991, v. 39, No. 5, 952-956).
1999, Higgins C. and F. Brinkhaus, 1999, "Efficacy of several organic acids against mold," J. Applied Poultry Res. v.8, 480-487.
2001, N. Hirazawa, et. al. ("Antiparasitic effect of medium-chain fatty acids against ciliated Crptocaryon irritans infestation in the red sea bream Pagrus major," 2001, Aquaculture v. 198, 219-228.
1986, Hooser, S. B., V. R. Beasly and J. J. Everitt, 1986, Effects of an Insecticidal Dip Containing D-limonene in the Cat, J. Am. Vet. Med. Assoc. v. 189, No. 8, 905-908.
2008, Hubert, J.; Munzbergova, Z.; Santino, A. "Plant volatile aldehydes as natural insecticides against storedproduct beetles." Pest Manag. Sci. 2008, v. 64, 57-64.
1993, Ishii, E., 1993, Antibacterial Activity of Terprenone, a Non Water-Soluble Antiulcer Agent, Against Helicobacter Pylori, Int. J. Med. Microbiol. Virol. Parasitol. Infect. Dis. v.280, No. 1-2, 239-243.
1997, Kadota, S., P. Basnet, E. Ishii, T. Tamura and T. Namba, 1997, Antibacterial Activity of Trichorabdal A from Rabdosia Trichocarpa Against Helicobacter Pylori, Zentralbl. Bakteriol v.287, No. 1 63-67.
1996, Karlson, J., A. K. Borg, R. Unelius, M. C. Shoshan, N. Wilking, U. Ringborg and S. Linder, 1996, "Inhibition of Tumor Cell Growth By Monoterpenes In Vitro: Evidence of a Ras-Independent Mechanism of Action," Anticancer Drugs v. 7, No. 4, 422-429.
1995, Kim, J., M. Marshall and C. Wei, 1995, Antibacterial Activity of Some Essential Oil Components Against Five Foodborne Pathogens, J. Agric. Food Chem. v.43, 2839-2845.
2004, Kim, Y. S.; Shin, D. H. "Volatile Constituents from the Leaves of Callicarpa japonica Thunb. and Their Antibacterial Activities." J. Agric. Food Chem. 2004, v. 52 , 781-787.

2008, Kishimoto, K.; Matsui, K.; Ozawa, R.; Takabayashi, J. "Direct fungicidal activities of C6-aldehydes are important constituents for defense responses in *Arabidopsis* against Botrytis cinerea." Phytochemistry 2008, v. 69, 2127-2132.
1999, Kubo, J.; Lee, J. R.; Kubo, I. "Anti-Helicobacter pylori Agents from the Cashew Apple." J. Agric. Food Chem. 1999, v. 47, 533-537.
2001, Kubo, I. And K. Fujita, "Naturally Occurring Anti-Salmonella Agents". J. Agric. Food Chem. 2001, v. 49, 5750-5754.
2004, B. Lederer, T. Fujimori., Y. Tsujino, K. Wakabayashi and P. Boger, 2004 "Phytotoxic activity of middle-chain fatty acids II: peroxidation and membrane effects." Pesticide Biochemistry and Physiology 80, 151-156.
1983, Mikhlin E. D., V. P. Radina, A. A. Dmitrossky, L. P. Blinkova, and L. G. Button, 1983, Antifungal and Antimicrobial Activity of Some Derivatives of Beta-Ionone and Vitamin A, Prikl Biokhim Mikrobiol, v. 19, 795-803.
1993, Muroi, H.; Kubo, A.; Kubo, I. "Antimicrobial Activity of Cashew Apple Flavor Compounds," J. Agric. Food Chem. 1993, v. 41, 1106-1109.
2002, Nakamura and Hatanaka ("Green-leaf-derived C6-aroma compounds with potent antibacterial action that act on both gram-negative and gram-positive bacteria." J. Agric. Food Chem. 2002, v. 50 No. 26, 7639-7644.
2007, Neri, F., M. Mari, S. Brigati and P. Bertolini, 2007, "Fungicidal activity of plant volatile compounds for controlling Monolinia laxa in stone fruit," Plant Disease v. 91,No. 1, 30-35.
2006, Neri, F.; Mari, M.; Menniti, A.; Brigati, S.; Bertolini, P. "Control of Penicillium expansum in pears and apples by trans-2-hexenal vapours." Postharvest Biol. and Tech. 2006, v. 41, 101-108.
2006, Neri, F.; Mari, M.; Menniti, A. M.; Brigati, S. "Activity of trans-2-hexenal against Penicillium expansum in 'Conference' pears." J. Appl. Microbiol. 2006, v. 100, 1186-1193.
1989, Leite, 1989 (Evaluation of the Antimicrobial Activity of Citral, Letters in Applied Microbiology v. 9, No. 3, 105-108.
1979, Paster, N. 1979, "A commerical study of the efficiency of propionic acid and calcium propionate as fungistats in poultry feed," Poult. Sci. v. 58, 572-576.
2008, Patrignani, F.; Lucci, L.; Belletti, N.; Gardini, F.; Guerzoni, M. E.; Lanciotti, R. "Effects of sub-letal concentrations of hexanal and 2-(E)-hexenal on membrane fatty acid composition and volatile compounds of Listeria monocytogenes, Staphylococcus aureus, Salmonella enteritidis and *Escherichia coli*." International J. Food Micro. 2008, v.123, 1-8.
1992, Rahnema, S. and S. M. Neal, 1992, Preservation and use of chemically treated high-moisture corn by weanling pigs, J. Prod. Agric. v. 5, No. 4, 458-461.
1986, Salt, S. D., S. Tuzun and J. Kuc, 1986, Effects of B-ionone and Abscisic Acid on the Growth of Tobacco and Resistance to Blue Mold, Mimicry the Effects of Stem Infection by Peronospora Tabacina, Adam Physiol. Molec. Plant Path v.28, 287-297.
2007, Saniewska, S. and M. Saniewski, 2007. "The effect of trans-2-hexenal and trans-2-nonaenal on the mycelium growth of Phoma narcissi in vitro, Rocz. AR. Pozn. CCCLXXXIII, Ogrodn. V. 41,189-193".
2008, Stout, M. D.; Bodes, E.; Schoonhoven, R.; Upton, P. B.; Travlos, G. S.; Swenberg, J. A. "Toxicity, DNA Binding, and Cell Proliferation in Male F344 Rats following Short-term Gavage Exposures to Trans-2-Hexenal." Soc. Toxicologic. Pathology Mar. 24, 2008, 1533-1601 online.
2006, Van Immerseel, F., J.B. Russell, M.D. Flythe, I. Gantois, L. Timbermont, F. Pasmans, F. Haesebrouck, and R. Ducatelle. 2006, "The use of organic acids to combat *Salmonella* in poultry: a mechanistic explanation of the efficacy," Avian Pathology. v. 35, No. 3, 182-188.
1995, Yu, S. G., P. J. Anderson and C. E. Elson, 1995, "The Efficacy of B-ionone in the Chemoprevention of Rat Mammary Carcinogensis," J. Agri. Food Chem. v. 43, 2144-2147.
Extended ESR 11820383.5.
Haque et al., "Proponic Acid is an Alternative to Antibiotics in Poultry Diet", Bangladesh Journal of Animal Science, 2009, pp. 115-122, vol. 38 (1&2).

(56) References Cited

OTHER PUBLICATIONS

Karabinos et al., "Bactericidal Activity of Certain Fatty Acids", The Journal of the American Oil Chemicals Society, Jun. 1954, pp. 228-232, vol. 31.
Lin et al., "Comparative Analysis of Extremem Acid Survival in *Salmonella typhimurium*, Shigella Flexneri, and *Escherichia coli*", Journal of Bacteriology, Jul. 1995, pp. 4097-4104, vol. 177, No. 14.
Opdyke et al., "Fragrance Raw Materials Monographs", Food and Cosmetics Toxicology, 1978, pp. 839-841, vol. 16, Suppl. 1.
Opposition against EP2768539, Filed on Sep. 4, 2017, 16 pages.
Opposition against EP3023009, Filed on Sep. 4, 2016, 15 pages.
Ponce De Leon et al., "Effect of Acetic and Citric Acids on the Growth and Activity (VB-N) of *Pseudomonas* sp. And *Moraxella* sp." Bulletin of the Faculty of Fisheries Hokkaido University, May 1993, pp. 80-85, vol. 44, No. 2.
Results of Experiments on the Antimicrobial Effects of the Compositions Claimed of Various Microorganisms, Sep. 4, 2017, 1 page.
Written Submission by Opponent in Opposition against EP2768539 filed Oct. 2, 2018, 7 pages.
Written Submission by Opponent in Opposition against EP2768539 filed Oct. 5, 2018, 3 pages.

\* cited by examiner

ANTIMICROBIAL FORMULATION

CROSS REFERENCE TO RELATED APPLICATIONS

This application is a national stage entry of PCT/US2011/47693, filed Aug. 13, 2011, which claims priority to provisional application 61/377,819, filed Aug. 27, 2010, entitled "ANTIMICROBIAL FORMULATION".

BACKGROUND OF THE INVENTION

Field of the Invention

A synergistic antimicrobial formulation containing a mixture of organic acids, α,β-Unsaturated aliphatic aldehydes and antimicrobial terpenes.

Background

A recent study by the Pew Charitable Trusts of Georgetown University suggested that food borne illnesses cost the United States $152 billion in health-related expenses each year. An estimated 76 million people in the U.S. get sick every year with food borne illness and 5,000 die, according to the U.S. Centers of Diseases Control and Prevention (Thomson Reuters 2010, Mar. 10, 2010).

There is a desire to find more natural and/or organic antimicrobials, which has resulted in a great amount of research and increased cost of raw materials due to the low commercial availability of these new natural/organic products.

Several new antimicrobials have been found in plants. We have found that when grass or other plants are damaged by cutting, trimming or being expose to pathogens, the lipoxygenase pathway is activated and this leads to the production of compounds that exhibit antimicrobial activity. Lipoxygenases are enzymes widely distributed in nature that catalyze the oxidation of unsaturated fatty acids, forming fatty acid hydroperoxides, which act as substrates for the synthesis of compounds with important roles in plant defense (Kishimoto, K.; Matsui, K.; Ozawa, R.; Takabayashi, J. "Direct fungicidal activities of C6-aldehydes are important constituents for defense responses in *Arabidopsis* against *Botrytis cinerea.*" *Phytochemistry* 2008, v. 69, 2127-2132; Gardini, F.; Lanciotti, R.; Guerzoni, M. E. "Effect of trans-2-hexenal on the growth of *Aspergillus flavus* in relation to its concentration, temperature and water activity." *Letters in App. Microbiology* 2001, v. 33, 50-55).

Aldehydes are represented by the general formula HCHO, where R is can be hydrogen or an aliphatic, aromatic or heterocyclic group. The α,β-Unsaturated aliphatic aldehydes of significant commercial importance are of three to ten carbon units. They are moderately soluble in water and solubility decreased as the molecular mass increase.

α,β-Unsaturated aliphatic aldehydes includes, propenal, trans-2-butenal, 2-methyl-2-butenal, 2-methyl-(F)-2-butenal, 2-pentenal, trans-2-hexenal, trans-2-hexen-1-ol, 2-methyl-2-pentanal, 2-isopropylpropenal, 2-ethyl-2-butenal, 2-ethyl-2-hexenal, (Z)-3-hexenal, 3,7-dimethyl-6-octenal, 3,7-dimethyl-2,6-octadienal, (2E)-3,7-dimethyl-2-6-octadienal, (2Z)-3,7-dimethyl-2,6-octadienal, trans-2-nonenal, (2E,6Z)-nonadienal, 10-undecanal, 2-dodecenal and other. The present invention includes C3 to C12 α,β-unsaturated aliphatic aldehydes.

The breakdown of fats and phospholipids leads to the formation of three six-carbon and nine-carbon aldehydes, within them (2E,6Z)-nonadienal, trans-2-nonaenal and trans-2-hexenal. These compounds are enzymatically produced by the combined action of two different enzymes of the plant lipoxygenase (LOX) pathway. In the first reaction, LOX catalyses the oxygenation of polyunsaturated fatty acids, such as linoleic and linolenic acids, with the consequent formation of 9- or 13-hydroperoxides. These compounds are very unstable and are cleaved into aldehydes and oxo acids by the enzyme hydroperoxide lyase (HPL). Starting from 9-hydroperoxy, trans-2-nonaenal and (2E,6Z)-nonadienal are obtained, whereas hexanal and trans-2-hexenal are obtained from 13-hydroperoxy derivatives. In the second reaction, these aldehydes can be converted into the corresponding alcohols by the action of alcohol dehydrogenase (Hubert, J.; Munzbergova, Z.; Santino, A. "Plant volatile aldehydes as natural insecticides against stored-product beetles." *Pest Manag. Sci.* 2008, v. 64, 57-64).

The volatile compound used in this invention is trans-2-hexenal, which is six carbon, double bond aldehyde, $C_6H_{10}O$ and MW=98.14. Natural or synthetic trans-2-hexenal, also known as leaf aldehyde is considered a natural flavoring according to EU Council Directive 88/388/EEC and US FDA 21CFR101.22.

Trans-2-hexenal is present in many edible plants such as apples, pears, grapes, strawberries, kiwi, tomatoes, olives, etc. The use of plants and plant extracts has been successful in studies looking for new antimicrobials. For example, cashew apple was effective against *Helicobacter pylori* and *S. cholerasuis* (50-100 ug/ml). The two main components were found to be anacardic acid and trans-2-hexenal. The minimum inhibitory and the minimum biocidal activities of trans-2-hexenal were determined to be 400 and 800 ug/ml, respectively (Kubo, J.; Lee, J. R.; Kubo, I. "Anti-*Helicobacter pylori* Agents from the Cashew Apple." *J. Agric. Food Chem.* 1999, v. 47, 533-537; Kubo, I. And K. Fujita, "Naturally Occurring Anti-*Salmonella* Agents". *J. Agric. Food Chem.* 2001, v. 49, 5750-5754). Kim and Shin found that trans-2-hexenal (247 mg/L) was effective against *B. cereus, S. typhimurium, V. parahaemolyticus, L. monocytogenes, S. aureus* and *E. coli* O157:H7 (Kim, Y. S.; Shin, D. H. "Volatile Constituents from the Leaves of *Callicarpa japonica* Thunb. and Their Antibacterial Activities." *J. Agric. Food Chem.* 2004, v. 52, 781-787). Nakamura and Hatanaka ("Green-leaf-derived C6-aroma compounds with potent antibacterial action that act on both gram-negative and gram-positive bacteria." *J. Agric. Food Chem.* 2002, v. 50 no, 26, 7639-7644), demonstrated that (3E)-hexenal was effective in controlling *Staphylococcus aureus, E. coli* and *Salmonella typhimurium* at a level of 3-30 ug/ml. Trans-2-hexenal completely inhibited proliferation of both *P. syringae* pathovars (570 μg/L of air) and *E. coli* (930 micrograms/L of air) (Deng, W.; Hamilton-Kemp, T.; Nielsen, M.; Anderson, R.; Collins, G.; Hilderbrand, D. "Effects of Six-Carbon Aldehydes and Alcohols on Bacterial Proliferation." *J. Agric. Food Chem.* 1993, v. 41, 506-510). It was observed that trans-2-hexenal at 250 ug/ml was effective on inhibiting the growth of *Phoma mycelium* (Saniewska, S. and M. Saniewski, 2007. "The effect of trans-2-hexenal and trans-2-nonaenal on the mycelium growth of *Phoma narcissi* in vitro, *Rocz. AR. Pozn. CCCLXXXIII, Ogrodn.* V. 41, 189-193"). In a study to control mold in fruits it was found that trans-2-hexenal was not phytotoxic to apricots, but it was phytotoxic to peaches and nectarines at 40 μL/L (Neri, F., M. Mari, S. Brigati and P. Bertolini, 2007, "Fungicidal activity of plant volatile compounds for controlling *Monolinia taxa* in stone fruit," *Plant Disease* v. 91, no. 1, 30-35). Trans-2-hexenal (12.5 μL/L) was effective on controlling

*Penicillium expansum* that causes blue mold (Neri, F.; Mari, M.; Menniti, A.; Brigati, S.; Bertolini, P. "Control of *Penicillium expansum* in pears and apples by trans-2-hexenal vapours." *Postharvest Biol. and Tech.* 2006, v. 41, 101-108. Neri, F.; Mari, M.; Menniti, A. M.; Brigati, S. "Activity of trans-2-hexenal against *Penicillium expansum* in 'Conference' pears." *J. Appl. Micrbiol.* 2006, v. 100, 1186-1193). Hamilton-Kemp, et. al, (*J. Agric. Food Chem.* 1991, v. 39, no. 5, 952-956) suggested that trans-2-hexenal vapors inhibited the germination of *Botrytis* spores and apple pollen.

US Patent Application No. 2007/0087094 suggests the use of at least two microbiocidally active GRAS compounds in combination with less than 50% alcohol (isopropanol or isopropanol/ethanol) as a microbicide. Trans-2-hexenal may be one of the GRAS compounds. Also, Archbold et. al. observed that the use of trans-2-hexenal at 0.86 or 1.71 mmol (100 or 200 microliters neat compound per 1.1 L container, respectively) for 2 weeks as for postharvest fumigation of seedless table grapes showed promise for control of mold (Archbold, D.; Hamilton-Kemp, T.; Clements, A.; Collins, R. "Fumigating 'Crimson Seedless' Table Grapes with (E)-2-Hexenal Reduces Mold during Long-term Postharvest Storage." *HortScience*. 1999, v. 34, no. (4, 705-707).

U.S. Pat. No. 5,698,599 suggests a method to inhibit mycotoxin production in a foodstuff by treating with trans-2-hexenal. Trans-2-hexenal completely inhibited the growth of *A. flavus, P. notatum, A. alternate, F. oxysporum, Cladosporium species, B. subtilis* and *A. tumerfaciens* at a concentration of 8 ng/L air. When comparing trans-2-hexenal to citral in controlling yeast ($10^5$ CFU/bottle) in beverages it was found that 25 ppm of trans-2-hexenal and thermal treatment (56° C. for 20 mM) was equivalent to 100-120 ppm citral. In beverages that were not thermally treated, 35 ppm of trans-2-hexenal was necessary to stabilize them (Belletti, N.; Kamdem, S.; Patrignani, F.; Lanciotti, R.; Covelli, A.; Gardini, F. "Antimicrobial Activity of Aroma Compounds against *Saccharomyces cerevisiae* and Improvement of Microbiological Stability of Soft Drinks as Assessed by Logistic Regression." *AEM*. 2007, v. 73, no. 17, 5580-5586). Not only has trans-2-hexenal been used as antimicrobial but it also been observed to be effective in the control of insects. Volatiles (i.e. trans-2-hexenal) were effective against beetles such as *Tibolium castaneum, Rhyzopertha dominica, Sitophilus granaries, Sitophilus orazyzae* and *Cryptolestes perrugineus* (Hubert, J.; Munzbergova, Z.; Santino, A. "Plant volatile aldehydes as natural insecticides against stored-product beetles." *Pest Manag. Sci.* 2008, v. 64, 57-64). U.S. Pat. No. 6,201,026, suggests an organic aldehyde of three or more carbons for the control of aphides.

Several patents suggest the use of trans-2-hexenal as a fragrance or perfume. U.S. Pat. No. 6,596,681 suggests using trans-2-hexenal as a fragrance in a wipe for surface cleaning. U.S. Pat. Nos. 6,387,866, 6,960,350 and 7,638,114, suggest using essential oils or terpenes (for example trans-2-hexenal) as a perfume for antimicrobial products. U.S. Pat. No. 6,479,044 discloses an antibacterial solution comprising an anionic surfactant, a polycationic antibacterial and water, where an essential oil is added as a perfume. This perfume could be a terpene such as trans-2-hexenal or another type of terpene. U.S. Pat. Nos. 6,323,171, 6,121,224 and 5,911,915, disclose antimicrobial purpose microemulsions containing a cationic surfactant where an essential oil is added as a perfume. This perfume can be various terpenes including trans-2-hexenal. U.S. Pat. No. 6,960,350 discloses an antifungal fragrance where a synergistic effect was found when different terpenes were used in combination (for example trans-2-hexenal with benzaldehyde).

The mode of action of trans-2-hexenal is thought to be through alteration of the cell membrane due to the reaction of trans-2-hexenal with sulfhydryl moieties or cysteine residues or formation of Schiff bases with amino groups of peptides and proteins (Deng, W.; Hamilton-Kemp, T.; Nielsen, M.; Anderson, R.; Collins, G.; Hilderbrand, D. "Effects of Six-Carbon Aldehydes and Alcohols on Bacterial Proliferation." *J. Agric. Food Chem.* 1993, v.41, 506-510). Trans-2-hexenal is reported to act as a surfactant, but likely permeates by passive diffusion across the plasma membrane. Once inside cells, its α,β-unsaturated aldehyde moiety reacts with biologically important nucleophilic groups. The α,β-unsaturated aldehyde moiety is known to react with sulphydryl groups, mainly by 1,4-addition under physiological conditions (Patrignani, F.; Lucci, L.; Belletti, N.; Gardini, F.; Guerzoni, M. E.; Lanciotti, R. "Effects of sub-lethal concentrations of hexanal and 2-(E)-hexenal on membrane fatty acid composition and volatile compounds of *Listeria monocytogenes, Staphylococcus aureus, Salmonella enteritidis* and *Escherichia coli.*" *International Food Micro.* 2008, v.123, 1-8).

Trans-2-hexenal is an inhibitor of phospholipase D, an enzyme that catalyses the hydrolysis of membrane phospholipids, which occurs during the maturation and ripening of many types of fruits and vegetables. Therefore, it is suggested that trans-2-hexenal may inhibit ripening (US Published Application No. 2005/0031744 A1). It is suggested that the inhibition of *Salmonella typhimurim* and *Staphylococcus aureus* by trans-2 hexenal is due to the hydrophobic and hydrogen bonding of its partition in the lipid bilayer. The destruction of electron transport systems and the perturbation of membrane permeability have been suggested as other modes of action (Gardini, F.; Lanciotti, R.; Guerzoni, M. E. "Effect of trans-2-hexenal on the growth of *Aspergillus flavus* in relation to its concentration, temperature and water activity." *Letters in App. Microbiology.* 2001, v. 33, 50-55). The inhibition of *P. expansum* decay may be due to damage to fungal membranes of germinating conidia. (Neri, F.; Mari, M.; Menniti, A.; Brigati, S.; Bertolini, P. "Control of *Penicillium expansum* in pears and apples by trans-2-hexenal vapours." *Postharvest Biol. and Tech.* 2006, v. 41, 101-108; Neri, F.; Mari, M.; Menniti, A. M.; Brigati, S. "Activity of trans-2-hexenal against *Penicillium expansum* in 'Conference' pears." *J. Appl. Micrbiol.* 2006, v.100, 1186-1193).

Studies have been performed to compare trans-2-hexenal to other similar compounds. Deng et. al. showed that the unsaturated volatiles trans-2-hexenal and trans-2-hexen-1-ol exhibited a greater inhibitory effect than the saturated volatiles, hexanal and 1-hexanol (Deng, W.; Hamilton-Kemp, T.; Nielsen, M.; Anderson, R.; Collins, G.; Hilderbrand, D. "Effects of Six-Carbon Aldehydes and Alcohols on Bacterial Proliferation." *J. Agric. Food Chem.* 1993, v. 41, 506-510). Trans-2-hexenal was more active than hexanal, nonanal and trans-2-octenal against all ATCC bacterial strains (Bisignano, G.; Lagana, M. G.; Trombetta, D.; Arena, S.; Nostro, A.; Uccella, N.; Mazzanti, G.; Saija, A. "In vitro antibacterial activity of some aliphatic aldehydes from *Olea europaea* L." *FEMS Microbiology Letters*. 2001, v. 198, 9-13). Other have found that (E)-2-hexenal had lower minimal fungal-growth-inhibiting concentrations than hexanal, 1-hexanol, (E)-2-hexen-1-ol, and (Z)-3-hexen-1-ol as determined for several species of molds, basically aldehydes>ketones>alcohols (Andersen, R. A.; Hamilton-Kemp, T.; Hilderbrand, D. F.; McCraken Jr., C. T.; Collins, R. W.; Fleming, P. D. Structure—Antifungal Activity Relationships among Volatile $C_6$ and $C_9$ Aliphatic Aldehydes, Ketones, and Alcohols. *J. Agric. Food Chem.* 1994, v. 42, 1563-1568). Trans-2-hexenal and hexanoic acid were more effective than hexanol in inhibiting *salmonella* (Kubo, I. And K. Fujita, "Naturally Occurring Anti-*Salmonella* Agents." *J. Agric. Food Chem.* 2001, v. 49, 5750-5754).

Muroi et al suggested that trans-2-hexenal exhibited broad antimicrobial activity but its biological activity (50 to 400 µg/mL) is usually not potent enough to be considered for practical applications (Muroi, H.; Kubo, A.; Kubo, I. "Antimicrobial Activity of Cashew Apple Flavor Compounds," *J. Agric. Food Chem.* 1993, v. 41, 1106-1109). Studies have shown that trans-2-hexenal can potentiate the effectiveness of certain types of antimicrobials. Several patents suggest the use of potentiators for aminoglycoside antibiotics (U.S. Pat. No. 5,663,152), and potentiators for polymyxin antibiotic (U.S. Pat. Nos. 5,776,919 and 5,587,358). These potentiators can include indol, anethole, 3-methylindole, 2-hydroxy-6-R-benzoic acid or trans-2-hexenal. A strong synergic effect was observed when trans-2-eptenal, trans-2-nonenal, trans-2-decenal and (E,E)-2,4-decadienal were tested together (1:1:1:1 ratio) against ATCC and clinically isolated microbial strains (Bisignano, G.; Lagana, M. G.; Trombetta, D.; Arena, S.; Nostra, A.; Uccella, N.; Mazzanti, G.; Saija, A. "In vitro antibacterial activity of some aliphatic aldehydes from *Olea europaea* L." *FEMS Microbiology Letters.* 2001, v. 198, 9-13).

Humans are exposed daily to trans-2-hexenal through consumption of food and beverages. Human exposure to trans-2-hexenal is ~350 µg/kg/day, with 98% derived from natural sources and 2% from artificial flavoring. It is unlikely for trans-2-hexenal to be toxic to humans since toxic levels in rats are 30 times higher than the normal intake by humans (Stout, M. D.; Bodes, E.; Schoonhoven, R.; Upton, P. B.; Traylos, G. S.; Swenberg, J. A. "Toxicity, DNA Binding, and Cell Proliferation in Male F344 Rats following Short-term Gavage Exposures to Trans-2-Hexenal." *Soc. Toxicologic. Pathology Mar.* 24, 2008, 1533-1601 online). In another rat study, feeding trans-2-hexenal at dietary levels of 0, 260, 640, 1600 or 4000 ppm fed for 13 wk did not induce any changes in hematological parameters or organ weights. At 4000 ppm there was a reduction in body weight and intake, but it was not significant (Gaunt, I. F.; Colley, J. "Acute and Short-term Toxicity Studies on trans-2-Hexenal." *Fd Cosmet. Toxicol.* 1971, v. 9, 775-786).

Even in fruits, twenty four hours to seven days exposure of pears and apples to trans-2-hexenal (12.5 µL/L) did not affect fruit appearance, color, firmness, soluble solids content or titrateable acidity. In a trained taste panel, no significant differences in the organoleptic quality of untreated and trans-2-hexenal treated "Golden Delicious" apples were observed, while maintenance of off-flavors was perceived in "Bartlett", "Abate Fetel" and "Royal Gala" fruit (Neri, F.; Mari, M.; Menniti, A.; Brigati, S.; Bertolini, P. Control of *Penicillium expansum* in pears and apples by trans-2-hexenal vapours. *Postharvest Biol. and Tech.* 2006, 41, 101-108; Neri, F.; Mari, M.; Menniti, A. M.; Brigati, S. Activity of trans-2-hexenal against *Penicillium expansum* in 'Conference' pears. *J. Appl. Micrbiol.* 2006, v.100, 1186-1193).

A concentration of 1.8 of trans-2-hexenal/mL of air inhibited soybean seed germination by nearly 100%. The order of inhibition of growth was trans-2-hexenal>hexanal>trans-2-nonenal when germinating seeds were exposed to saturating vapors of the aldehydes (Gardner, H. W.; Dornbos Jr., D. L.; Desjardins, A. E. Hexenal, trans-2-Hexenal, and trans-2-Nonenal Inhibit Soybean, *Glycine max*, Seed Germination. J. *Agric. Food Chem.* 1990, v. 38, 1316-1320)

The prior art has not suggested or observed that the use of trans-2-hexenal in combination with organic acids improved synergistically the antimicrobial activity of either of the components by themselves. It has suggested synergy with the combination of essential oils and as potentiators of antibiotics.

Commercial mold inhibitors and bactericides are composed of a single organic acid or a mixture of organic acids and formaldehyde. These acids are primarily propionic, benzoic acid, butyric acid, acetic, and formic acid. Organic acids have been a major additive to reduce the incidence of food borne infections. The mechanism by which small chain fatty acids exert their antimicrobial activity is that undissociated (RCOOH=non-ionized) acids are lipid-permeable and in this way they can cross the microbial cell wall and dissociate in the more alkaline interior of the microorganism (RCOOH→RCOO⁻+H⁺) making the cytoplasm unstable for survival. (Van Immerseel, F., J. B. Russell, M. D. Flythe, I. Gantois, L. Timbermont, F. Pasmans, F. Haesebrouck, and R. Ducatelle. 2006, "The use of organic acids to combat *Salmonella* in poultry: a mechanistic explanation of the efficacy," *Avian Pathology*. v. 35, no. 3, 182-188; Paster, N. 1979, "A commercial study of the efficiency of propionic acid and calcium propionate as fungistats in poultry feed," Poult. Sci. v. 58, 572-576).

Propionic acid is amore potent mold inhibitor that acetic, valeric, butyric, lactic and benzoic acid. Propionic acid has an effective dose between 0.05 and 0.25% contrary to the other organic acids that required over 0.5% (Higgins C. and F. Brinkhaus, 1999, "Efficacy of several organic acids against mold," *J. Applied Poultry Res.* v.8, 480-487).

Feeding corn treated with 0.5% of a mixture containing 80% propionic acid and 20% acetic acid had no detrimental effect on the performance of weanling pigs (Rahnema, S, and S. M. Neal, 1992, Preservation and use of chemically treated high-moisture corn by weanling pigs, J. Prod. Agric. v. 5, no. 4, 458-461). In broiler chickens, the addition of 0, 0.1, 0.2, 0.3 and 0.4% acetic acid to water did not affect performance or intestinal microbial counts in broiler chickens (Akbari, M. R., H. Kermanshani and G. A. Kalidari, 2004, "Effect of acetic acid administration in drinking water on performance growth characteristics and Heal microflora of broiler chickens," *J. Sci. & Technol. Agric. & Natur. Resour.* 8 (3): 148).

Pelargonic acid (nonanoic acid) is a naturally occurring fatty acid. It is oily, colorless fluid, which at lower temperature becomes solid. It has a faint odor compared to butyric acid and is almost insoluble in water. Pelargonic acid has been used as a non-selective herbicide. Scythe (57% pelargonic acid, 3% related fatty acids and 40% inert material) is a broad-spectrum post-emergence or burn-down herbicide produced by Mycogen/Dow Chemicals. The herbicidal mode of action of pelargonic acid is due first to membrane leakage during darkness and daylight and second to peroxidation driven by radicals originating during daylight by sensitized chlorophyll displaced from the thylakoid membrane (B. Lederer, T. Fujimori., Y. Tsujino, K. Wakabayashi and P. Boger, 2004 "Phytotoxic activity of middle-chain fatty acids II: peroxidation and membrane effects." *Pesticide Biochemistry and Physiology* 80, 151-156).

Chadeganipour and Haims (2001) showed that the minimum inhibitory concentration (MIC) of medium chain fatty acids to prevent growth of *M. gypseum* was 0.02 mg/ml capric acid and for pelargonic acid 0.04 mg/ml on solid media and 0.075 mg/ml cupric acid and 0.05 mg/ml pelargonic in liquid media. These acids were tested independently and not as a mixture (Chadeganipour and Haims, 2001

"Antifungal activities of pelargonic and capric acid on Microsporum gypseum" *Mycoses* v. 44, no 3-4, 109-112). N. Hirazawa, et. al. ("Antiparasitic effect of medium-chain fatty acids against ciliated *Crptocaryon irritans* infestation in the red sea bream *Pagrus major*," 2001, *Aquaculture* v. 198, 219-228) found that nonanoic acid as well as $C_6$ to $C_{10}$ fatty acids were effective in controlling the growth of the parasite *C. irritans* and that $C_8$, $C_9$ and $C_{19}$ were the more potent. It was found that *Trichoderma harzianum*, a biocontrol for cacao plants, produces pelargonic acid as one of many chemicals, which was effective in controlling the germination and growth of cacao pathogens (Aneja, M., Gianfagna, T. J., and Hebbar, K. P. 2005. "*Trichoderma harzianum* produces nonanoic acid, an inhibitor of spore germination and mycelial growth of two cacao pathogens". *Physiol. Mol. Plant Pathol.* 67, 304-307).

Several US patents disclose the use of pelargonic acid as a fungicide and bactericide: US Published Application #2004/026685 discloses a fungicide for agricultural uses that is composed of one or more fatty acids and one or more organic acids different from the fatty acid. In the mixture of the organic acids and the fatty acids, the organic acid acts as a potent synergist for the fatty acid to function as a fungicide. U.S. Pat. No. 5,366,995 discloses a method to eradicate fungal and bacterial infections in plants and to enhance the activity of fungicides and bactericides in plants through the use of fatty acids and their derivatives. This formulation is consists of 80% pelargonic acid or its salts for the control of plants fungi. The fatty acids used are primarily $C_9$ to $C_{18}$. U.S. Pat. No. 5,342,630 discloses a novel pesticide for plant use containing an inorganic salt that enhances the efficacy of $C_8$ to $C_{22}$ fatty acids. One of the examples shows a powdered product with 2% pelargonic acid, 2% capric acid, 80% talc, 10% sodium carbonate and 5% potassium carbonate. U.S. Pat. No. 5,093,124 discloses a fungicide and arthropodice for plants comprising alpha mono carboxylic acids and their salts. Preferably the fungicide contains $C_9$ to $C_{10}$ fatty acids, partially neutralized by active alkali metal such as potassium. The mixture described consists of 40% active ingredient dissolved in water and includes 10% pelargonic, 10% capric acid and 20% coconut fatty acids, all of with are neutralized with potassium hydroxide. U.S. Pat. No. 6,596, 763 discloses a method to control skin infection using $C_6$ to $C_{18}$ fatty acids or their derivatives. U.S. Pat. Nos. 6,103,768 and 6,136,856 disclose the unique utility of fatty acids and derivatives to eradicate existing fungal and bacterial infections in plants. This method is not preventive but showed effectiveness in already established infections. Sharpshooter, a commercially available product with 80% pelargonic acid, 2% emulsifier and 18% surfactant showed effectiveness against *Penicillium* and *Botrytis* spp. U.S. Pat. No. 6,638, 978 discloses an antimicrobial preservative composed of a glycerol fatty acid ester, a binary mixture of fatty acids ($C_6$ to $C_{18}$) and a second fatty acid ($C_6$ to $C_{18}$) where the second fatty acid is different from the first fatty acid for preservation of food. WO 01/97799 discloses the use of medium chain fatty acids as antimicrobial agents. It shows that an increase in pH from 6.5 to 7.5 increased the MIC of the short chain fatty acids containing 6- to 8-carbon chains.

Pelargonic acid is used as a component of a food-contact surface-sanitizing solution in food handling establishments. A product from EcoLab containing 6.49% pelargonic acid as active ingredient may be used as a sanitizer for all food contact surfaces (12 CFR 178.1010 b). The FDA has cleared pelargonic acid as a synthetic food flavoring agent (21 CFR 172.515), as an adjuvant, production aid and sanitizer to be used in contact with food (12 CFR 178.1010 b) and in washing or to assist in lye peeling of fruits and vegetables (12 CFR 173.315). Pelargonic acid is included in the USDA list of Authorized Substances, 1990, section 5.14, Fruit and Vegetable Washing Compounds.

Emulsifier or ethoxylated non-ionic surfactant like ethoxylated castor oil are produced by the reaction of oil with ethylene oxide. Ethoxylated castor oil emulsifiers are of various chain lengths, depending on the quantity of ethylene oxide used during synthesis. The molar ratio can vary from 1 molecule of castor oil and 1 to 2000 molecules of ethylene oxide producing an ethoxylated castor oil emulsifier also named PEG-x (polyethylene glycol) castor oil emulsifier, where "x" is the number of ethylene oxide molecules. (Fruijtier-Polloth, Claudia, 2005, "Safety assessment on polyethylene glycols (PEGs) and their derivatives as used in cosmetic products" *Toxicology*, v. 214, 1-38). These emulsifiers have been widely used to solubilize water insoluble drugs for human and animal treatments. They are nonvolatile, stable compounds, which do not hydrolyze or deteriorate on storage. Castor oil is obtained from the seeds of *Ricinus communis* and consists primarily of the triglycerides of ricinoleic, isoricinoleic, stearic and dihydroxystearic acids. Castor Oil is 90% ricinoleic acid (12-hydroxyoleic acid), nontoxic, biodegradable, and a renewable resource.

Several PCT applications have been filed on the uses of ethoxylated castor oil surfactants. WO 99/60865 relates to a surfactant-water emulsion added to animal feed before or after heat treatment. This patent relates to an emulsion to help maintain or to reduce water lost during heat treatment. The emulsion consisting of 1-8 parts of water and 0.005-0.5 parts of surfactant. WO 97/28896 relates to the use of the surfactant to facilitate the dispersion of molasses. WO 96/11585 relates to the use of ethoxylated castor oil in animal feed for the improvement of the nutrient value of feed. WO 95/28091 relates to the addition of ethoxylated castor oil into feed to improve the availability of the nutritious substance in conventional dry animal feed in order to increase animal growth and decrease mortality. These four patents mention the addition of ethoxylated castor oil surfactant, preferably an emulsion, to improve digestibility of hydrophobic substances present in animal feed and do not show any benefit on the production of feed or prevention of mold growth in feed.

Terpenes, which are Generally Recognized as Safe (GRAS), are widespread in nature, mainly in plants as constituents of essential oils. Their building block is the hydrocarbon isoprene $(C_5H_8)_n$. Examples of terpenes include citral, pinene, nerol, b-ionone, geraniol, carvacrol, eugenol, carvone, terpeniol, anethole, camphor, menthol, limonene, nerolidol, farnesol, phytol, carotene, squalene, thymol, tocotrienol, perillyl alcohol, borneol, myrcene, simene, carene, terpinene, linalool and others. Geraniol, tocotrienol, perillyl alcohol, b-ionone and d-limonene, suppress hepatic HMG-COA reductase activity, a rate-limiting step in cholesterol synthesis, and modestly lower cholesterol levels in animals (Elson C. E. and S. G. Yu, 1994, "The Chemoprevention of Cancer by Mevalonate-Derived Constituents of Fruits and Vegetables," J. Nutr. v. 124, 607-614). D-limonene and geraniol reduced mammary tumors (Elgebede, J. A., C. E. Elson, A. Qureshi, M. A. Tanner and M. N. Gould, 1984, "Inhibition of DMBA-Induced Mammary Cancer by Monoterpene D-limonene," Carcinogensis v.5, no. 5, 661-664; Elgebede, J. A., C. E. Elson, A. Qureshi, M. A. Tanner and M. N. Gould, 1986, "Regression of Rat Primary Mammary Tumors Following Dietary D-limonenc," J. Nat'l Cancer Institute v.76, no. 2, 323-325; Karlson, J., A. K. Borg, R. Unelius, M. C. Shoshan, N. Wilking, U. Ringborg and S. Linder, 1996, "Inhibition of Tumor Cell Growth By Monoterpenes In Vitro: Evidence of a Ras-Independent Mechanism of Action," Anticancer Drugs v. 7, no. 4, 422-429) and suppressed the growth of transplanted tumors (Yu, S. G., P. J. Anderson and C. E. Elson, 1995, "The Efficacy of B-ionone in the Chemoprevention of Rat Mammary Carcinogensis," J. Agri. Food Chem. v. 43, 2144-2147).

Terpenes have also been found to inhibit the in vitro growth of bacteria and fungi (Chaumont J. P. and D. Leger, 1992, "Campaign Against Allergic Moulds in Dwellings, Inhibitor Properties of Essential Oil Geranium "Bourbon," Citronellol, Geraniol and Citral," Ann. Pharm. Fr v. 50, no. 3, 156-166), and some internal and external parasites (Hooser, S. B., V. R. Beasly and J. J. Everitt, 1986, Effects of an Insecticidal Dip Containing D-limonene in the Cat, J. Am. Vet. Med. Assoc. v. 189, no. 8, 905-908). Geraniol was found to inhibit growth of *Candida albicans* and *Saccharomyces cerevisiae* strains by enhancing the rate of potassium leakage and disrupting membrane fluidity (Bard, M., M. R. Albert, N. Gupta, C. J. Guuynn and W. Stillwell, 1988, Geraniol Interferes with Membrane Functions in Strains of *Candida* and *Saccharomyces*, Lipids v. 23, no. 6, 534-538). B-ionone has antifungal activity which was determined by inhibition of spore germination and growth inhibition in agar (Mikhlin E. D., V. P. Radina, A. A. Dmitrossky, L. P. Blinkova, and L. G. Button, 1983, Antifungal and Antimicrobial Activity of Some Derivatives of Beta-Ionone and Vitamin A, Prikl Biokhim Mikrobiol, v. 19, 795-803; Salt, S. D., S. Tuzun and J. Kuc, 1986, Effects of B-ionone and Abscisic Acid on the Growth of Tobacco and Resistance to Blue Mold, Mimicry the Effects of Stem Infection by *Peronospora Tabacina*, Adam Physiol. Molec. Plant Path v.28, 287-297). Terprenone (geranylgeranylacetone) has an antibacterial effect on *H. pylori* (Ishii, E., 1993, Antibacterial Activity of Terprenone, a Non Water-Soluble Antiulcer Agent, Against *Helicobacter Pylori*, Int. J. Med. Microbiol. Virol. Parasitol. Infect. Dis. v.280, no. 1-2, 239-243). Solutions of 11 different terpenes were effective in inhibiting the growth of pathogenic bacteria in in vitro tests (Kim, J., M. Marshall and C. Wei, 1995, Antibacterial Activity of Some Essential Oil Components Against Five Foodborne Pathogens, J. Agric. Food Chem. v.43, 2839-2845). Diterpenes, i.e., trichorabdal A (from *R. Trichocarpa*), have shown a very strong antibacterial effect against *H. pylori* (Kadota, S., P. Basnet, E. Ishii, T. Tamura and T. Namba, 1997, Antibacterial Activity of Trichorabdal A from *Rabdosia Trichocarpa* Against *Helicobacter Pylori*, Zentralbl. Bakteriol v.287, no. 1 63-67). Owawunmi, 1989 (Evaluation of the Antimicrobial Activity of Citral, Letters in Applied Microbiology v. 9, no. 3, 105-108), showed that growth media with more than 0.01% citral reduced the concentration of *E. coli*, and at 0.08% there was a bactericidal effect. U.S. Pat. No. 5,673,468, teaches a terpene formulation, based on pine oil, used as a disinfectant or antiseptic cleaner. U.S. Pat. No. 5,849,956, teaches that a terpene found in rice has antifungal activity. U.S. Pat. No. 5,939,050 teaches an oral hygiene antimicrobial product with a combination of 2 or 3 terpenes that showed a synergistic effect.

SUMMARY OF THE INVENTION

An object of the invention is to improve the microbicidal effect of organic acids on animal feed by including at least 10 wt. %, based on the total weight, of the aldehyde trans-2-hexenal. The antimicrobial composition may be an aqueous solution containing one organic acid or a mixture of several organic acids, in combination with the aldehyde.

The composition may further contain a ethoxylated non-ionic surfactant.

The composition may further contain antimicrobial terpenes or essential oils.

The organic acids may have 1- to 24-carbon chain length, and may be saturated, unsaturated, cyclic and can be substituted by functional groups containing halo, hydroxyl, amino, ether or ester moieties.

The surfactant may be an ethoxylated castor oil surfactant with an HLB (hydrophilic-lipophilic balance) from 4 to 18. It may also comprise other non-ionic, ionic or amphoretic surfactants or other surfactant of similar properties such as Tween.

The terpenes of the composition may comprise allyl disulfide, thymol, citral, eugenol, carvacrol, limonene and carvone, or mixtures thereof.

In addition to trans-2-hexenal, the composition may contain a volatile aldehyde resulting from the lipoxygenase pathway including (2E,6Z)-nonadienal, trans-2-nonenal, and others α,β-Unsaturated aliphatic aldehydes i.e. propenal, trans-2-butenal, 2-methyl-2-butenal, 2-methyl-(E)-2-butenal, 2-pentenal, trans-2-hexen-1-ol, 2-methyl-2-pentanal, 2-isopropylpropenal, 2-ethyl-2-butenal, 2-ethyl-2-hexenal, (Z)-3-hexenal, 3,7-dimethyl-6-octenal, 3,7-dimethyl-2,6-octadienal, (2E)-3,7-dimethyl-2-6-octadienal, (2Z)-3,7-dimethyl-2,6-octadienal, trans-2-nonenal, (2E,6Z)-nonadienal, 10-undecanal, 2-dodecenal and other α,β-unsaturated aliphatic aldehydes with antimicrobial and flavoring properties as well as their respective alcohol and acid forms.

A mixture of the invention contains 1 to 90 wt. % organic acids and 5 to 99% trans-2-hexenal.

The mixture may contain 0 to 90 wt. % acetic acid, preferably 10 to 55 wt. %.

The mixture may contain 0 to 90 wt. % butyric acid preferably 10 to 55 wt. %.

The mixture may contain 0 to 90 wt. % propionic acid, preferably 10 to 55 wt. %.

The mixture may contain 0 to 90 wt. % pelargonic acid, preferably 5 to 10 wt. %

The mixture may contain 0 to 90 wt. % lactic acid, preferably 10 to 40 wt. % The mixture may contain 0 to 90 wt. % formic acid, preferably 10 to 55 wt. %

The mixture may contain 0 to 90 wt. % succinic acid, preferably 20 to 30 wt. %

The mixture may contain 0 to 90 wt. % lauric acid, preferably 1 to 10 wt. %

The mixture may contain 0 to 90 wt. % myristic acid, preferably 1 to 5 wt. %

The mixture may contain 0 to 90 wt. % caprylic acid, preferably 5 to 20 wt. %

The mixture may contain 0 to 90 wt. % levulinic acid, preferably 1 to 20 wt. %

The mixture may contain 0 to 90 wt. % volatile α,β-Unsaturated aliphatic aldehydes, preferably 1 to 30 wt. %

The mixture may contain 0 to 50 wt. % by volume terpenes, preferably 0.5 to 7 wt. %

The mixture may contain 0 to 50 wt. % of an antimicrobial terpene, preferably 0.5 to 7 wt. %

The mixture may contain 0 to 20 wt. % by volume surfactant, preferably 0.5 to 10 wt. %

The mixture may contain 0.5 to 10 wt. % of ethoxylated castor oil surfactant with 1 to 200 ethylene molecules, preferably 1 to 5.0 wt. %

The mixture of the invention may contain 0.5 to 10 wt. % surfactant with similar properties that of ethoxylated castor oil surfactant, preferably 1 to 5.0 wt. %

The mixture of the invention may contain 0 to 97 wt. % water, preferably 1 to 20 wt. %

The composition is effective against various fungi present in feed and major feed ingredients.

The composition is effective against various bacteria present in feed and major feed ingredients.

The composition is effective against various bacteria and fungi present in water.

The composition is effective against microbes detrimental for the production of alcohol from fermentation of cellulose, starch or sugars.

Another object of the invention is to provide a method of treating animal feed, comprising: mixing animal feed with an effective amount of an anti-microbial composition comprising 1 to 90 wt. %, based on the total weight, of a $C_1$ to $C_{24}$ organic acid, 10 to 55 wt. %, based on the total weight, of an α,β-Unsaturated aliphatic aldehyde e.g. trans-2-hexenal, 0 to 30 wt. % based on the total weight of terpenes, 0 to 10 wt. % based on the total weight of a surfactant, and water.

DESCRIPTION OF THE PREFERRED EMBODIMENTS

Definitions

A "volume percent" of a component is based on the total volume of the formulation or composition in which the component is included.

An "organic acid" of the composition may be formic, acetic, propionic, butyric, pelargonic, lactic and other $C_2$ to $C_{24}$ fatty acids or mono-, di-, or triglycerides containing $C_1$ to $C_{24}$ fatty acids. These fatty acids comprising small chain, medium chain, long chain fatty acids or small chain, medium chain, long chain triglycerides.

An α,β-Unsaturated aliphatic aldehydes of the composition may be propenal, trans-2-butenal, 2-methyl-2-butenal, 2-methyl-(E)-2-butenal, trans-2 hexenal, 2-pentenal, trans-2-hexen-1-ol, 2-methyl-2-pentanal, 2-isopropylpropenal, 2-ethyl-2-butenal, 2-ethyl-2-hexenal, (Z)-3-hexenal, 3,7-dimethyl-6-octenal, 3,7-dimethyl-2,6-octadienal, (2E)-3,7-dimethyl-2-6-octadienal, (2Z)-3,7-dimethyl-2,6-octadienal, trans-2-nonenal, (2E,6Z)-nonadienal, 10-undecanal, 2-dodecenal and other α,β-unsaturated aliphatic aldehydes with antimicrobial and flavoring properties as well as their respective alcohol and acid forms.

An "antimicrobial terpene" of the composition can comprise, allyl disulfide, citral, pinene, nerol, geraniol, carvacrol, eugenol, carvone, anethole, camphor, menthol, limonene, farnesol, carotene, thymol, borneol, myrcene, terpinene, linalool, or mixtures thereof. More specifically, the terpenes can comprise allyl disulfide, thymol, citral, eugenol, limonene, carvacrol, and carvone, or mixtures thereof.

By the term "effective amount" of a compound is meant such amount capable of performing the function of the compound or property for which an effective amount is expressed, such as a non-toxic but sufficient amount to provide the desired antimicrobial benefits. Thus an appropriate effective amount may be determined by one of ordinary skill in the art using only routine experimentation Formulations can vary not only in the concentration of major components, i.e., organic acids, but also in the type of aldehydes, terpenes, surfactants and water concentration used. This invention can be modified in several ways by adding or deleting from the formulation the terpene, type of organic acid, aldehyde and type of surfactant.

The term "synergistic effect" or "synergy" means improved the preservative effect when the ingredients are added as a mixture rather than as individual components.

Composition

A composition of the present invention comprises an effective amount of organic acids of 1 to 24 carbon chain and an α,β-Unsaturated aliphatic aldehydes e.g. trans-2-hexenal.

The antimicrobial terpenes, plant extracts or essential oils containing terpenes may be used as well as the more purified terpenes. Terpenes are readily available commercially or can be produced by various methods known in the art, such as solvent extraction or steam extraction/distillation and chemical synthesis.

The surfactant is non-ionic. including ethoxylated castor oil surfactant with 1 to 2000 polyethylene links, preferably from 20 through 100.

The preferred composition contains 1 to 90 wt. % organic acids and 1 to 30% trans-2-hexenal, wherein the organic acid may be 10 to 55 wt. % acetic acid, 10 to 55 wt. % propionic acid, 10 to 40 wt. %% lactic acid, or 5.0 to 10 wt. % pelargonic acid, and mixtures thereof. The preferred composition may also contain 0.5 to 7 wt. % terpenes, 0.5 to 10 wt. % surfactant and 1.0 to 10 wt. % water.

Methods

The present invention is effective against bacteria and fungi. It is applied in such a form that provides a uniform and homogeneous distribution of the mixture throughout the feed.

The present invention may be applied to water.

The present invention may be applied to the raw material before entering the mixer.

The present invention may be applied to the unmixed raw materials in the mixer.

The present invention may be applied during the mixing of the raw ingredients.

The present invention may be applied by a spray nozzle.

One of the objectives is to control the level of microbes in feed and feedstuffs. Several mixtures of organic acids, terpenes and aldehydes resulted in formulations that showed effectiveness against bacteria in buffer and feed. Another objective is to formulate an antimicrobial with naturally occurring compounds or safe-to-use compounds. All of the chemicals used in the invention are currently approved for human uses as antimicrobials, flavor enhancers and perfumery.

There were unexpected results, i.e. synergism beyond additive effects, when trans-2-hexenal was added to the organic acids and terpenes.

Throughout this disclosure various publications are referenced, which are all hereby incorporated by reference in their entireties into this application.

EXAMPLES

Examples 1 and 2

Procedure: The following formulations were prepared for duplicate in vitro studies. All reagents were of the highest purity and laboratory grade. For acetic acid, a 56% solution was prepared. Succinic acid was diluted in water to 5% solution due to solubility problems. Two commercial products, a formic/propionic acid blend and a formaldehyde/propionic acid blend, were tested for comparison purposes.

*monella* in feed. A formaldehyde/propionic acid blend was tested for comparison purposes. Poultry mash feed was amended with a meat and bone meal inoculum of *Salmo-*

CHEMICAL FORMULATIONS FOR EXAMPLES 1 AND 2

| CHEMICAL | % Chemical in Formulation |||||||||||||
|---|---|---|---|---|---|---|---|---|---|---|---|---|
| | 1 | 2 | 3 | 4 | 5 | 6 | 7 | 8 | 9 | 10 | 11 | 12 |
| Eugenol | 6.25 | 6.25 | 6.25 | 6.25 | 6.25 | 6.25 | 6.25 | 6.25 | 6.25 | 6.25 | 6.25 | 0 |
| Carvacrol | 6.25 | 6.25 | 6.25 | 6.25 | 6.25 | 6.25 | 6.25 | 6.25 | 6.25 | 6.25 | 6.25 | 0 |
| CO60* (surfactant) | 5.00 | 5.00 | 5.00 | 5.00 | 5.00 | 5.00 | 5.00 | 5.00 | 5.00 | 5.00 | 5.00 | 0 |
| Pelargonic acid | 10.0 | 10.0 | 10.0 | 10.0 | 10.0 | 10.0 | 10.0 | 10.0 | 10.0 | 10.0 | 10.0 | 0 |
| Acetic acid (56%) | 22.5 | 32.5 | 22.5 | 22.5 | 22.5 | 37.5 | 22.5 | 12.5 | 32.5 | 12.5 | 0 | 0 |
| Lactic acid | 20.0 | 0 | 0 | 0 | 0 | 0 | 0 | 10.0 | 40.0 | 0 | 0 | 0 |
| Propionic acid | 30.0 | 30.0 | 30.0 | 30.0 | 30.0 | 30.0 | 30.0 | 50.0 | 0 | 40.0 | 42.5 | 10.0 |
| Formic acid | 0 | 0 | 0 | 0 | 0 | 0 | 0 | 0 | 0 | 0 | 0 | 70.0 |
| Succinic acid (5%) | 0 | 0 | 0 | 0 | 0 | 0 | 0 | 0 | 0 | 20.0 | 30.0 | 0 |
| Lauric acid | 0 | 0 | 0 | 0 | 0 | 0 | 20.0 | 0 | 0 | 0 | 0 | 0 |
| Myristic acid | 0 | 0 | 0 | 0 | 0 | 5.0 | 0 | 0 | 0 | 0 | 0 | 0 |
| Caprylic acid | 0 | 0 | 0 | 0 | 20.0 | 0 | 0 | 0 | 0 | 0 | 0 | 0 |
| Levulinic acid | 0 | 0 | 0 | 20.0 | 0 | 0 | 0 | 0 | 0 | 0 | 0 | 20.0 |
| trans-2-hexenal | 0 | 10.0 | 20.0 | 0 | 0 | 0 | 0 | 0 | 0 | 0 | 0 | 0 |
| TOTAL | 100.0 | 100.0 | 100.0 | 100.0 | 100.0 | 100.0 | 100.0 | 100.0 | 100.0 | 100.0 | 100.0 | 100.0 |

*CO-60 is ethoxylated castor oil surfactant with 60 ethylene units.

A suspension of *Salmonella typhimurium* was added to two test tubes containing 0.05% (500 ppm) of each formulation. The tubes were vortexed, incubated at room temperature for 24 hours and then the solution was plated on SMA (Standard Methods Agar) for 48 hours before counting *Salmonella* colonies.

Results: The following table shows that several of the formulations were effective in controlling *Salmonella* growth.

Results: Studies 1 and 2.
24 H cfu/ml (0.05%)

| Treatment | Study 1 | % Reduction | Study 2 | % Reduction |
|---|---|---|---|---|
| Control | 1093 | | 1900 | |
| Formula 1 | 0 | 100.0 | 37 | 98.1 |
| Formula 2 | 7 | 99.4 | 10 | 99.5 |
| Formula 3 | 13 | 98.8 | 0 | 100.0 |
| Formula 4 | 33 | 97.0 | 130 | 93.2 |
| Formula 5 | 27 | 97.5 | 133 | 93.0 |
| Formula 6 | 83 | 92.4 | 163 | 91.4 |
| Formula 7 | 143 | 86.9 | 240 | 87.4 |
| Formula 8 | 20 | 98.2 | 70 | 96.3 |
| Formula 9 | 3 | 99.7 | 0 | 100.0 |
| Formula 10 | 147 | 86.6 | 160 | 91.6 |
| Formula 11 | 197 | 82.0 | 283 | 85.1 |
| Formula 12 | 0 | 100.0 | 0 | 100.0 |
| Formic/Propionic acid | 0 | 100.0 | 0 | 100.0 |
| Formaldehyde (33%) | 0 | 100.0 | 0 | 100.0 |

Conclusions: The formulations resulted in different responses against *Salmonella*. Formulations with higher levels of trans-2-hexenal and lactic acid performed better than all of the others with the exception of formaldehyde and formic acid based products.

Conclusions: The formulations resulted in different responses against *Salmonella*. Formulations with higher levels of trans-2-hexenal and lactic acid performed better than all of the others with the exception of formaldehyde and formic acid based products.

Example 3

Procedure: From the previous in vitro studies, six formulations were chosen to test their effectiveness against *Sal-* *nella typhimurium*. Contaminated feed was then treated with either 1, 2 and 3 kg/MT of the formulations listed below. After 24 hours, 10 g of subsamples of the treated feed were suspended in 90 ml of Butterfield buffer. Dilutions were plated on XLT-4 agar and incubated at 37° C. for 48 hours before counting *Salmonella* colonies. The formulas used for this experiment are shown in the following table.

CHEMICAL FORMULATIONS FOR EXAMPLE 3

| Chemical FORMULAS | % Chemical in Formulation ||||||
|---|---|---|---|---|---|---|
| | 1 | 2 | 3 | 8 | 9 | 12 |
| Eugenol | 6.25 | 6.25 | 6.25 | 6.25 | 6.25 | 0 |
| Carvacrol | 6.25 | 6.25 | 6.25 | 6.25 | 6.25 | 0 |
| CO60* | 5.00 | 5.00 | 5.00 | 5.00 | 5.00 | 0 |
| Pelargonic acid | 10.00 | 10.00 | 10.00 | 10.00 | 10.00 | 0 |
| Acetic acid (56%) | 22.50 | 32.50 | 22.50 | 12.50 | 32.50 | 0 |
| Lactic acid | 20.00 | 0 | 0 | 10.00 | 40.00 | 0 |
| Propionic acid | 30.00 | 30.00 | 30.00 | 50.00 | 0 | 10.00 |
| Formic acid | 0 | 0 | 0 | 0 | 0 | 70.00 |
| Levulinic acid | 0 | 0 | 0 | 0 | 0 | 20.00 |
| trans-2-hexenal | 0 | 10.00 | 20.00 | 0 | 0 | 0 |
| Total | 100.00 | 100.00 | 100.00 | 100.00 | 100.00 | 100.00 |

*CO-60 is ethoxylated castor oil surfactant with 60 ethylene units.

Results: The following table shows that several of the formulations were effective in controlling *Salmonella* growth.

| Treatment | Kg/MT | cfu/gr | % REDUCTION |
|---|---|---|---|
| Formula 1 | 0 | 2540 | |
| | 1 | 2010 | 21 |
| | 2 | 1730 | 32 |
| | 3 | 1385 | 45 |
| Formula 2 | 0 | 1860 | |
| | 1 | 895 | 52 |
| | 2 | 583 | 69 |
| | 3 | 273 | 85 |

-continued

| Treatment | Kg/MT | cfu/gr | % REDUCTION |
|---|---|---|---|
| Formula 3 | 0 | 2220 | |
| | 1 | 815 | 63 |
| | 2 | 420 | 81 |
| | 3 | 80 | 96 |
| Formula 8 | 0 | 2080 | |
| | 1 | 1670 | 20 |
| | 2 | 1540 | 26 |
| | 3 | 1325 | 36 |
| Formula 9 | 0 | 2005 | |
| | 1 | 1313 | 34 |
| | 2 | 1470 | 27 |
| | 3 | 1150 | 43 |
| Formula 12 | 0 | 2080 | |
| | 1 | 1010 | 51 |
| | 2 | 230 | 89 |
| | 3 | 93 | 96 |
| Formaldehyde (33%) | 0 | 1180 | |
| | 1 | 0 | 100 |
| | 2 | 0 | 100 |
| | 3 | 0 | 100 |

Conclusions: Formulas containing trans-2-hexenal showed greater effectiveness against *Salmonella*. Formulations with high level of trans-2-hexenal resulted in similar effectiveness as compared to the formaldehyde (33% formaldehyde) and formic acid based products.

Conclusions: Formulas containing trans-2-hexenal showed greater effectiveness against *Salmonella*. Formulations with high level of trans-2-hexenal resulted in similar effectiveness as compared to the formaldehyde (33% formaldehyde) and formic acid based products.

Example 4

Procedure: Five formulations were chosen to test their effectiveness against *Salmonella typhimurium* Poultry mash feed was amended with a meat and bone meal inoculum of *Salmonella typhimurium*. Contaminated feed was then treated with either 1, 2 and 3 kg/MT of the formulations listed below. After 24 hours, 10 g of subsamples of the treated feed were suspended in 90 ml Butterfield buffer. Dilutions were plated on XLT-4 agar and incubated at 37° C. for 48 hours before counting *Salmonella* colonies. Additional samples were taken 7 and 14 days after treatment for *Salmonella* enumeration. The formulas used are shown in the following table.

| CHEMICAL FORMULATIONS FOR EXAMPLE 4 | | | | | |
|---|---|---|---|---|---|
| | % Chemical in Formulation | | | | |
| Chemical | 16 | 17 | 18 | 19 | 20 |
| Eugenol | 5.00 | 0.00 | 0.00 | 0.50 | 1.00 |
| Carvacrol | 5.00 | 0.00 | 0.00 | 0.50 | 1.00 |
| CO60* | 5.00 | 0.00 | 0.00 | 0.50 | 1.00 |
| Pelargonic acid | 5.00 | 5.00 | 5.00 | 5.00 | 5.00 |
| Acetic acid (56%) | 30.00 | 45.00 | 20.00 | 47.50 | 53.00 |
| Propionic acid | 20.00 | 20.00 | 50.00 | 26.00 | 24.00 |
| Trans-2-hexenal | 30.00 | 30.00 | 25.00 | 20.00 | 15.00 |
| | 100.00 | 100.00 | 100.00 | 100.00 | 100.00 |

*CO-60 is ethoxylated castor oil surfactant with 60 ethylene units.

Results: The following table shows that several of the formulations were effective in controlling *Salmonella*.

| Effect of Chemicals on *Salmonella* at 1, 7 and 14 Days Post-Treatment | | | | | | | |
|---|---|---|---|---|---|---|---|
| Treatment | | *Salmonella* at 24 H | | *Salmonella* at 7 Days | | *Salmonella* at 14 Days | |
| Formula | Rate Kg/MT | cfu/gr feed | % reduction | cfu/gr feed | % reduction | cfu/gr feed | % reduction |
| Formula #16 | 0 | 1.2E+05 | | 1.8E+05 | | 6.4E+04 | |
| | 1 | 2.8E+04 | 77 | 2.3E+04 | 86.9 | 1.5E+04 | 77.1 |
| | 2 | 1.2E+04 | 90 | 6.3E+03 | 96.4 | 4.3E+03 | 93.2 |
| | 3 | 2.0E+03 | 98 | 1.0E+03 | 99.4 | 3.3E+02 | 99.5 |
| Formula #17 | 0 | 1.5E+05 | | 1.5E+05 | | 1.4E+05 | |
| | 1 | 5.0E+04 | 66 | 3.5E+04 | 76.9 | 3.5E+04 | 75.8 |
| | 2 | 1.4E+04 | 91 | 6.0E+03 | 96.0 | 2.3E+03 | 98.4 |
| | 3 | 3.3E+02 | 100 | 3.3E+02 | 99.8 | 1.0E+03 | 99.3 |
| Formula #18 | 0 | 1.3E+05 | | 1.5E+05 | | 1.4E+05 | |
| | 1 | 3.7E+04 | 72 | 2.7E+04 | 82.3 | 2.5E+04 | 81.4 |
| | 2 | 7.3E+03 | 94 | 1.2E+04 | 92.1 | 7.7E+03 | 94.4 |
| | 3 | 7.3E+03 | 94 | 3.3E+03 | 97.8 | 6.7E+02 | 99.5 |
| Formula #19 | 0 | 1.4E+05 | | 1.8E+05 | | 8.2E+04 | |
| | 1 | 5.5E+04 | 59 | 7.2E+04 | 60.8 | 2.7E+04 | 66.9 |
| | 2 | 6.3E+03 | 95 | 2.0E+04 | 88.9 | 1.1E+04 | 86.5 |
| | 3 | 3.7E+03 | 97 | 4.0E+03 | 97.8 | 6.3E+03 | 92.2 |
| Formula #20 | 0 | 1.3E+05 | | 2.0E+05 | | 8.0E+04 | |
| | 1 | 6.5E+04 | 48 | 7.5E+04 | 62.4 | 4.0E+04 | 49.8 |
| | 2 | 2.8E+04 | 77 | 2.7E+04 | 86.4 | 1.2E+04 | 85.5 |
| | 3 | 9.7E+03 | 92 | 1.4E+04 | 93.2 | 1.0E+04 | 87.6 |

Conclusions: All formulations resulted in a reduction in *Salmonella* counts in feed. Formulas with low level of trans-2-hexanal (<15%) were not as effective as the others.

Example 5

Procedure: Formulations #17 and #18 containing trans-2-hexenal were compared to six other formulations containing lesser amounts of this aldehyde but with increased levels of lactic acid. Poultry mash feed was amended with a meat and bone meal inoculum of *Salmonella typhimurium*. Contaminated feed was then treated with either 1, 2 and 3 kg/MT of the formulations listed below. After 24 hours, 10 g of subsamples of the treated feed were suspended in 90 ml Butterfield buffer. Dilutions were plated on XLT-4 agar and incubated at 37° C. for 48 hours before counting *Salmonella* colonies. Additional samples were taken 7 and 14 days after treatment for *Salmonella* enumeration. The formulas used are shown in the following table.

CHEMICAL FORMULATIONS FOR EXAMPLE 5

| Chemical | % Chemical in Formulation | | | | | | | |
|---|---|---|---|---|---|---|---|---|
| FORMULAS | 17 | 18 | 21 | 22 | 23 | 24 | 25 | 26 |
| Eugenol | 0.00 | 0.00 | 0.00 | 0.00 | 0.00 | 0.75 | 0.00 | 0.00 |
| Carvacrol | 0.00 | 0.00 | 0.00 | 0.00 | 0.00 | 0.75 | 0.00 | 0.00 |
| CO-60* | 0.00 | 0.00 | 0.00 | 5.00 | 5.00 | 5.00 | 8.00 | 0.00 |
| Pelargonic acid | 5.00 | 5.00 | 5.00 | 5.00 | 5.00 | 5.00 | 5.00 | 0.00 |
| Acetic acid (56%) | 45.00 | 20.00 | 38.00 | 40.00 | 35.00 | 30.00 | 36.00 | 0.00 |
| trans-2-hexenal | 30.00 | 25.00 | 5.00 | 5.00 | 5.00 | 10.00 | 10.00 | 0.00 |
| Propionic acid | 20.00 | 50.00 | 12.00 | 15.00 | 10.00 | 10.00 | 15.00 | 10.00 |
| Lactic | 0.00 | 0.00 | 40.00 | 30.00 | 40.00 | 38.50 | 26.00 | 0.00 |
| Formic acid (88%) | 0.00 | 0.00 | 0.00 | 0.00 | 0.00 | 0.00 | 0.00 | 90.00 |
| TOTAL | 100.00 | 100.00 | 100.00 | 100.00 | 100.00 | 100.00 | 100.00 | 100.00 |

*CO-60 is ethoxylated castor oil surfactant with 60 ethylene units.

Results: The following table shows that several of the formulations were effective in controlling *Salmonella*.

Effect of Chemicals on *Salmonella* at 1, 7 and 14 Days Post-Treatment

| Treatments | Treatment Rate kgs/MT | *Salmonella* at Day 1 | | *Salmonella* at Day 7 | | *Salmonella* at Day 14 | |
|---|---|---|---|---|---|---|---|
| | | cfu/gr feed | % Reduction | cfu/gr feed | % Reduction | cfu/gr feed | % Reduction |
| Formula #17 | 0 | 1.75E+05 | | 1.11E+05 | | 1.07E+04 | |
| | 1 | 3.93E+04 | 77.52 | 2.67E+03 | 97.60 | 3.33E+03 | 68.75 |
| | 2 | 1.00E+03 | 99.43 | 3.33E+02 | 99.70 | 1.00E+03 | 90.63 |
| | 3 | 6.70E+02 | 99.62 | 0.00E+00 | 100.00 | 6.67E+02 | 93.75 |
| Formula #18 | 0 | 1.87E+05 | | 6.77E+04 | | 8.33E+03 | |
| | 1 | 7.07E+04 | 62.21 | 1.13E+04 | 83.25 | 1.00E+03 | 88.00 |
| | 2 | 9.67E+03 | 94.83 | 4.00E+03 | 94.09 | 3.33E+02 | 96.00 |
| | 3 | 6.00E+03 | 96.79 | 6.67E+02 | 99.01 | 0.00E+00 | 100.00 |
| Formula #21 | 0 | 1.17E+05 | | 1.31E+05 | | 1.40E+04 | |
| | 1 | 6.60E+04 | 43.59 | 3.40E+04 | 74.05 | 7.33E+03 | 47.62 |
| | 2 | 2.30E+04 | 80.34 | 2.30E+04 | 82.44 | 3.50E+03 | 75.00 |
| | 3 | 8.67E+03 | 92.59 | 8.67E+03 | 93.38 | 1.33E+03 | 90.48 |
| Formula #22 | 0 | 2.30E+05 | | 2.08E+05 | | 7.00E+03 | |
| | 1 | 1.65E+05 | 28.41 | 4.13E+04 | 80.13 | 3.33E+03 | 52.38 |
| | 2 | 6.97E+04 | 69.71 | 1.30E+04 | 93.75 | 1.50E+03 | 78.57 |
| | 3 | 2.13E+04 | 90.72 | 4.33E+03 | 97.92 | 1.00E+03 | 85.71 |
| Formula #23 | 0 | 1.13E+05 | | 1.66E+05 | | 5.33E+03 | |
| | 1 | 1.01E+05 | 10.88 | 7.07E+04 | 57.52 | 2.00E+03 | 62.50 |
| | 2 | 5.95E+04 | 47.50 | 2.83E+04 | 82.97 | 1.33E+03 | 75.00 |
| | 3 | 3.00E+04 | 73.53 | 5.67E+03 | 96.59 | 1.00E+03 | 81.25 |
| Formula #24 | 0 | 1.75E+05 | | 9.70E+04 | | 5.00E+03 | |
| | 1 | 5.73E+04 | 67.14 | 3.70E+04 | 61.86 | 1.00E+03 | 80.00 |
| | 2 | 3.10E+04 | 82.23 | 1.27E+04 | 86.94 | 1.00E+03 | 80.00 |
| | 3 | 2.20E+04 | 87.39 | 4.00E+03 | 95.88 | 6.67E+02 | 86.67 |
| Formula #25 | 0 | 2.36E+05 | | 8.20E+04 | | 2.27E+04 | |
| | 1 | 1.11E+05 | 52.97 | 2.37E+04 | 71.14 | 6.67E+03 | 70.59 |
| | 2 | 9.13E+04 | 61.30 | 7.00E+03 | 91.46 | 4.00E+03 | 82.35 |
| | 3 | 4.10E+04 | 82.63 | 3.00E+03 | 96.34 | 6.67E+02 | 97.06 |
| Formula #26 | 0 | 1.53E+05 | | 5.15E+04 | | 1.13E+04 | |
| | 1 | 8.40E+04 | 45.10 | 1.17E+04 | 77.35 | 3.67E+03 | 67.65 |
| | 2 | 3.37E+04 | 78.00 | 6.00E+03 | 88.35 | 2.33E+03 | 79.41 |
| | 3 | 1.53E+04 | 89.98 | 6.67E+02 | 98.71 | 1.33E+03 | 88.24 |

Conclusions: By decreasing the level of trans-2-hexenal (to 5%-25%) and increasing the level of lactic acid (to 26%-40%), a similar response was obtained as conpared to high levels of trans-2-hexenal (30%).

Conclusions: By decreasing the level of trans-2-hexenal (to 5-25%) and increasing the level of lactic acid (t) 26%-40%), a similar response was obtained as compared to high levels of trans-2-hexenal (30%).

Example 6

Procedure: Four out of seven formulations tested from Example 5 demonstrated a satisfactory effect against *Salmonella typhimurium* A new formulation (formula 27) and a formaldehyde based antimicrobial (33% formaldehyde) were tested in this study. Poultry mash feed was amended with a meat and bone meal inoculum of *Salmonella typhimurium*. Contaminated feed was then treated with either 1, 2 and 3 kg/MT of the formulations listed below. After 24 hours, 10 g of subsamples of the treated feed were suspended in 90 ml of Butterfield buffer. Dilutions were plated on XLT-4 agar and incubated at 37° C. for 48 hours before counting *Salmonella* colonies. Additional samples were taken 7, 14 and 21 days after treatment for *Salmonella* enumeration. The formulas used are shown in the following table.

CHEMICAL FORMULATIONS FOR EXAMPLE 6

| Chemicals | % Chemical in Formulation | | | | | |
|---|---|---|---|---|---|---|
| FORMULAS | 17 | 18 | 22 | 25 | 27 | HCHO |
| CO60* | 0.00 | 0.00 | 5.00 | 8.00 | 10.00 | 0.00 |
| Pelargonic acid | 5.00 | 5.00 | 5.00 | 5.00 | 5.00 | 0.00 |
| Acetic acid (56%) | 45.00 | 20.00 | 40.00 | 36.00 | 40.00 | 0.00 |
| trans-2-hexenal | 30.00 | 25.00 | 5.00 | 10.00 | 5.00 | 0.00 |
| Propionic acid | 20.00 | 50.00 | 15.00 | 15.00 | 10.00 | 10.00 |
| Lactic | 0.00 | 0.00 | 30.00 | 26.00 | 30.00 | 0.00 |
| Formaldehyde (37%) | 0.00 | 0.00 | 0.00 | 0.00 | 0.00 | 90.00 |
| Total | 100.00 | 100.00 | 100.00 | 100.00 | 100.00 | 100.00 |

*CO-60 is ethoxylated castor oil surfactant with 60 ethylene units.

Results: The following table shows that several of the formulations were effective in controlling *Salmonella*

Effect of Chemicals on *Salmonella* at 1, 7 and 14 Days Post-Treatment

| Treatment Formula | Rate Dose kg/MT | *Salmonella* at 24 Hours | | *Salmonella* at Day 7 | | *Salmonella* at Day 14 | | *Salmonella* at Day 21 | |
|---|---|---|---|---|---|---|---|---|---|
| | | cfu/g | % reduction | cfu/g | % reduction | cfu/g | % reduction | cfu/g | % reduction |
| 17 | 0 | 56408 | | 11969 | | 25889 | | 4150 | |
| | 1 | 14600 | 74.1 | 4550 | 62.0 | 11400 | 56.0 | 1633 | 60.7 |
| | 2 | 3900 | 93.1 | 1400 | 88.3 | 4833 | 81.3 | 267 | 93.6 |
| | 3 | 2900 | 80.1 | 1150 | 90.4 | 1300 | 95.0 | 0 | 100.0 |
| 18 | 0 | 56408 | | 11969 | | 25889 | | 4150 | |
| | 1 | 18400 | 67.4 | 2200 | 81.6 | 10533 | 59.3 | 1300 | 68.7 |
| | 2 | 5400 | 90.4 | 2900 | 75.8 | 5133 | 80.2 | 200 | 95.2 |
| | 3 | 1800 | 96.8 | 1317 | 89.0 | 1767 | 93.2 | 33 | 99.2 |
| 22 | 0 | 56408 | | 11969 | | 25889 | | 4150 | |
| | 1 | 43000 | 23.8 | 10217 | 14.6 | 17667 | 31.8 | 2567 | 38.1 |
| | 2 | 31000 | 45.0 | 6450 | 46.1 | 15167 | 41.4 | 800 | 80.7 |
| | 3 | 26600 | 52.8 | 2133 | 82.2 | 11500 | 55.6 | 233 | 94.4 |
| 25 | 0 | 56408 | | 11969 | | 25889 | | 4150 | |
| | 1 | 19450 | 65.5 | 7217 | 39.7 | 13233 | 48.9 | 1300 | 68.7 |
| | 2 | 9500 | 83.2 | 1967 | 83.6 | 9333 | 63.9 | 367 | 91.2 |
| | 3 | 5900 | 89.5 | 767 | 93.6 | 8867 | 65.7 | 450 | 89.2 |
| 27 | 0 | 56408 | | 11969 | | 25889 | | 4150 | |
| | 1 | 33000 | 41.5 | 10017 | 16.3 | 13600 | 47.5 | 633 | 84.7 |
| | 2 | 24150 | 57.2 | 9367 | 21.7 | 11933 | 53.9 | 367 | 91.2 |
| | 3 | 17150 | 69.6 | 4983 | 58.4 | 7367 | 71.5 | 267 | 93.6 |
| HCHO* | 0 | 56408 | | 11969 | | 25889 | | | |
| | 1 | 150 | 99.7 | 0 | 100.0 | 0 | 100.0 | | |
| | 2 | 150 | 99.7 | 0 | 100.0 | 0 | 100.0 | | |
| | 3 | 0 | 100.0 | 0 | 100.0 | 0 | 100.0 | | |

*Formaldehyde (33%)/propionic blend

Conclusions: All formulations resulted in greater than 90% effectiveness 2 or 3 weeks after treatment.

Conclusions: All formulations resulted in greater than 90% effectiveness 2 or 3 weeks after treatment.

Example 7

This experiment was to determine if Formula #18 has residual activity post treatment. Commercial poultry feed was ground with the Romer mill to a fine particle size to ensure uniform mixing of the inoculum into the feed. Feed (1-kg subsamples) was transferred to 1 gallon glass which were randomly assigned to treatments. The contents of the one gallon glass jar was added to the lab scale feed mixer and mixed for 1-2 minutes, prior to treatment with 0, 1, 2, or 3 kg/ton of Formula #18. There was one replicate application replicate per treatment level. After treatment, feed was recontaminated with 10 g of Salmonella inoculum and mixed an additional 2-3 minutes. The contents of the mixer were transferred to the original one-gallon glass jar, capped and allowed to sit for 1 day at room temperature (23-24° C.). Feed samples (three 10 g-subsamples/treatment) were obtained at 24 hrs, 7 and 14 days after recontamination using aseptic techniques. Subsamples were transferred to dilution bottles containing 100 ml of Butterfield buffer. Serial dilutions were plated on 2 separate XLT-4 agar plates. Agar plates are incubated at 37° C. for 48 hours before counting of Salmonella.

The level of Salmonella from the three replicate samples/treatment at the different time intervals was averaged and is reported in the following table.

| % Effectiveness Against Recontamination of Salmonella | | | |
|---|---|---|---|
| Formula # 18 (dose) | Day 1 | Day 7 | Day 14 |
| 1 kg/MT | 63 | 70 | 54 |
| 2 kg/MT | 75 | 45 | 87 |
| 3 kg/MT | 82 | 73 | 98 |

It is observed that Formula #18 retained effectiveness 14 days after feed had been contaminated with Salmonella.

It will be apparent to those skilled in the art that a number of modifications and variations may be made in the present invention without departing from the scope of the invention. It is intended that the specification and examples be considered as exemplary only and are not restrictive, with a true scope and spirit of the invention being indicated by the following claims.

The invention claimed is:

1. A method of treating an animal feed that is a solid, said method comprising mixing the animal feed with an effective amount of an anti-salmonella composition that is not compositionally modified before or while being mixed with the animal feed, wherein the anti-salmonella composition comprises:
   pelargonic acid at an amount in a range of about 5 wt % to about 10 wt % of the composition;
   propionic acid at an amount in a range about 65 wt % to about 75 wt % of the composition; and
   trans-2-hexenal at an amount in a range of about 15 wt % to about 25 wt % of the composition;
thereby resulting in a treated animal feed suitable for consumption by an animal for which the animal feed is appropriate, wherein the treated animal feed comprises the animal feed and the effective amount of the anti-salmonella composition.

2. The method of claim 1, wherein the amount of pelargonic acid is about 5 wt %, the amount of propionic acid is about 75 wt %, and the amount of trans-2-hexenal is about 20 wt. %.

3. The method of claim 1, wherein the animal feed is mixed with the anti-salmonella composition via spraying and the effective amount of the anti-salmonella composition corresponds to an application rate in a range of about 1 kg to about 3 kg of the anti-salmonella composition per metric ton of the animal feed.

* * * * *